(12) United States Patent
Lichowski (10) Patent No.: US 9,908,395 B2
(45) Date of Patent: Mar. 6, 2018

(54) AUTOMATIC MULTIFUNCTION SCREEN DEVICE FOR VEHICLES

(71) Applicants: Claudio Sebastina Damm Rios, Puerto Montt (CL); Ricardo Basilio Lichowski, San Carlos de Bariloche, Rio Negro (AR)

(72) Inventor: Ricardo Basilio Lichowski, San Carlos de Bariloche (AR)

(*) Notice: Subject to any disclaimer, the term of this patent is extended or adjusted under 35 U.S.C. 154(b) by 9 days.

(21) Appl. No.: 14/911,693

(22) PCT Filed: Aug. 13, 2014

(86) PCT No.: PCT/CL2014/000038
§ 371 (c)(1),
(2) Date: Feb. 11, 2016

(87) PCT Pub. No.: WO2015/021568
PCT Pub. Date: Feb. 19, 2015

(65) Prior Publication Data
US 2016/0200185 A1   Jul. 14, 2016

(30) Foreign Application Priority Data

Aug. 13, 2013   (AR) .............................. P130102864

(51) Int. Cl.
*B60J 11/04*   (2006.01)
*B60J 11/02*   (2006.01)

(52) U.S. Cl.
CPC .............. *B60J 11/04* (2013.01); *B60J 11/02* (2013.01)

(58) Field of Classification Search
CPC ... B60J 11/00; B60J 11/04; B60J 11/02; B60J 11/06; B60J 11/08; B60J 7/10; B60J 7/102; B60J 7/0007
(Continued)

(56) References Cited

U.S. PATENT DOCUMENTS 4,971,384 A * 11/1990 Baldwin .................. B60J 11/00
135/88.08
5,823,607 A * 10/1998 Hindson .................. B60J 11/02
160/370.21
(Continued)

FOREIGN PATENT DOCUMENTS

AU       523082       7/1982
GB       739641       11/1955
(Continued)

OTHER PUBLICATIONS

International Search Report with English Language Translation, dated Sep. 17, 2014, Application No. PCT/CL2014/000038.

*Primary Examiner* — D Glenn Dayoan
*Assistant Examiner* — Sunsurraye Westbrook
(74) *Attorney, Agent, or Firm* — Womble Bond Dickinson (US) LLP (57) ABSTRACT

An automatic multipurpose shield device for vehicles, comprising an extendible tubular-shaped structure mounted on cross bars of the roof rack through a rotatory base. Said extendible structure is composed of two parts: a main container body (a) and a secondary body (b), the latter located inside the main container body (a) during the resting state and connected by longitudinal rails. The extendible tubular structure has two pairs of shield rolls connected to a mechanism and attached to two pairs of projecting arms that allow the automatic extension thereof, covering the entire length of the vehicle. The shield rolls may carry flexible solar cells or operate only to protect the vehicle against sun and hail.

9 Claims, 8 Drawing Sheets (58) Field of Classification Search
USPC ........ 296/136.12, 136.13, 100.18, 95.1, 135, 296/152, 77.1, 83, 143, 161, 211; 160/370.21, 377, 378, 122, 184, 25; 150/166, 159, 167
See application file for complete search history.

(56) References Cited

U.S. PATENT DOCUMENTS

| | | | | |
|---|---|---|---|---|
| 7,311,112 | B2* | 12/2007 | Pacheco ................. | B60J 11/02 135/88.05 |
| 7,354,096 | B2* | 4/2008 | Hacker ................... | B60J 11/00 296/136.12 |
| 9,533,558 | B2* | 1/2017 | Suh ......................... | B60J 11/04 |
| 2011/0088855 | A1 | 4/2011 | Boustani | |
| 2012/0146358 | A1* | 6/2012 | Sassi ....................... | B60J 11/02 296/136.12 |

FOREIGN PATENT DOCUMENTS

| | | |
|---|---|---|
| WO | WO-9425303 | 11/1994 |
| WO | WO-2007099384 | 9/2007 |
| WO | WO-2012004497 | 1/2012 |

\* cited by examiner

AUTOMATIC MULTIFUNCTION SCREEN DEVICE FOR VEHICLES

TECHNICAL FIELD OF THE INVENTION

The present invention refers to an automatic multipurpose shield device for vehicles, consisting of a self-extendible container that houses a fabric roll system, which may carry flexible solar cells or be just fabric to provide protection against sun and hail. These fabric rolls unfold and refold automatically by using articulated arm pairs. The device may be applied in both automobiles and vessels.

BACKGROUND AND PROBLEMS TO BE SOLVED

Nowadays, the constant climate change translates into more violent and frequent meteorological events, together with occasional hail, which in most cases do not allow enough time to protect the goods (automobile or vessel) when using elements for manual coverage, a task that takes too much time considering the emergency and violence of the meteor, which causes damage from the moment it starts. Said task may become even more difficult depending on the situation of the individual (traffic jams or heavy traffic) and mainly due to the potential combination of winds that turn the goods-coverage task an impossible mission. It should also be appreciated that the person seeking to protect the good could suffer serious physical damage.

The invention claimed herein provides a safe and effective solution to the user, as the protective fabric system is placed and unfolded rapidly and automatically, without any risk for the user to get injured.

In case a semiautomatic version of the system is selected, the risk is still significantly reduced compared with other options of the market, because the protective fabrics are already aligned and ready to unfold upon the user's intervention.

Its application also allows protecting the goods from the sun rays, and for this reason, the present invention constitutes a protective system available to be used often, anytime and anywhere. The energy from the sun, ultraviolet rays, acid rain, salt, air pollution, liquids from insects and birds' feces constantly affect the vehicle.

For this protective system, the use of glass fiber fabrics with close weave, soaked in PTFE (Teflón®) or variants thereof, is contemplated. In addition, in order to strengthen said fabrics even more, the component Kevlar® may also be incorporated.

It should be noted that the system prevents protective fabrics from contacting the vehicle's surface. Due to their PTFE-containing composition, the fabrics repel the adherence of particles and impurities, thus minimizing rubbing and, as a consequence, the possibility of the goods' finish getting damaged. Glass fiber fabrics may be soaked in silicone in one or both faces, thereby attaining great flexibility and a high sliding ratio.

From this application, different types of benefits may be obtained, such as safety, space availability in the trunk as it is not used by other protectors, frugality (there is no need to use a covered garage to avoid the sun; less expensive insurance policies, as they do not cover "damage caused by hail," etc.)

On the other hand, based on the energy problems and the air pollution caused by the thousands of internal combustion vehicles, there is an increasing need to use vehicles powered, for example, by solar energy. It is thus contemplated, as another application of the proposed device, that rolls of the multipurpose shield may carry flexible solar cells aimed at recharging batteries of hybrid or electric vehicles.

OBJECT OF THE INVENTION

For the specified purposes, this invention consists of an automatic multipurpose shield device to be applied mainly in automobiles and vessels.

The device comprises a quasi-watertight container compartment supported by cross bars of the roof rack. This tubular-shaped structure made of extruded metal consists of two parts: a main container body and a secondary body; the latter located inside the main body in a resting state.

The secondary body comes into contact with the main body through linear guideways or longitudinal rails.

Inside the tubular structure, there are two pairs of protective fabric or flexible solar cells rolls with the following distribution:

A lower pair, attached to the main body by terminal supports;

An upper pair, with one (proximal) end supported from the main body and the other (distal) end with supports fixed to the secondary body.

Each of the axes that constitute the lower pair is composed of a tubular motor inside a winding tube and has, adjusted at its end, a gear for direct transmission towards an equal gear also fixed at the proximal end of the upper axes. Said upper axes, unlike the lower axes, are not fitted with tubular motors; instead, they are formed by a set of grooved axes located inside the corresponding winding tubes.

The main body has two grooves, a front groove and a rear groove, through which the corresponding fabrics or rolls are slid. In a resting state, these grooves are sealed through a box system for an airtight closing. Each pair of front and rear rolls has on their adjacent edge, straps of 'Velcro grip' along its length, except at the beginning to provide the shifting of the upper rolls when the secondary body is projected or retracted.

Below the grooves of the main body, both on its front and rear side, an articulated projecting arm supported by a longitudinal bar fixed to the main body is provided.

Below each of the arms, a projecting arm is provided, which is fixed to the main body through a robust extendible rail. Each of the movable articulated arms is attached on its base, in contact with the rail, to the internal face of the top of the secondary body by an adjustable anchorage.

The box system comprises on both sides two moldings, a main molding attached to the lower fabric roll, and a secondary molding attached to the upper fabric roll. The secondary molding is located inside the main molding as a rail, allowing the secondary molding to shift inside the container molding when the movable articulated arm, to which it is attached by a joint, is shifted jointly with the secondary body, shifting at the same time and on the same direction the edge of the upper fabric. In turn, the container or main molding is attached to the fixed articulated arm also by a joint.

The cross bars of the roof rack support the main body through a rotatory base. Said base is connected to a worm drive system, said gear ring representing the rotatory axis of the main body through the above-mentioned rotatory base.

The movement of the worm drive system controlled by an electronic control unit (E.C.U.) is transmitted to the main body as well as to a geared pulley attached to said ring. This pulley transmits its movement through a geared belt to a pulley located near the end of the main body, and this, in turn, transmits its movement to a gear train that produces the shifting of a rack that is attached to the main body by a rail. This rack hits the internal face of the top of the secondary body and it is affixed to it, transmitting its longitudinal movement to the secondary body, printing its projection or fold.

The central or electronic control unit (E.C.U) controls both the actuation of the direct current servomotor and the direct current tubular motors. These, in turn, may be fitted with electronic or mechanical ends of stroke. The elements described above constitute the basic components to apply the preferred embodiment of the present invention, although alternative embodiments are possible, which comprise additional and supplementary elements to enhance the operation of the protective device. Some examples are the incorporation, in each of the articulated arms, of a gas shock absorber as well as a linear direct current mini actuator controlled by the E.C.U., thereby attaining a better performance when unwinding the protective fabrics, no matter how tilted the vehicle is. In this case, tubular motors may or may not be dispensed with. In case tubular motors were dispensed with, rolling drums such as those used in projection screens and self-rolling curtain systems would be incorporated into the roll system.

DETAILED DESCRIPTION OF THE INVENTION

As shown in FIGS. 1 to 4, the automatic multipurpose shield device, in a preferred embodiment, comprises a tubular-shaped structure (a), made of a folded or extruded material which may be of a light metal alloy such as aluminum, or constituted by a synthetic material with good mechanical strength and out in the air properties.

Figure 7:
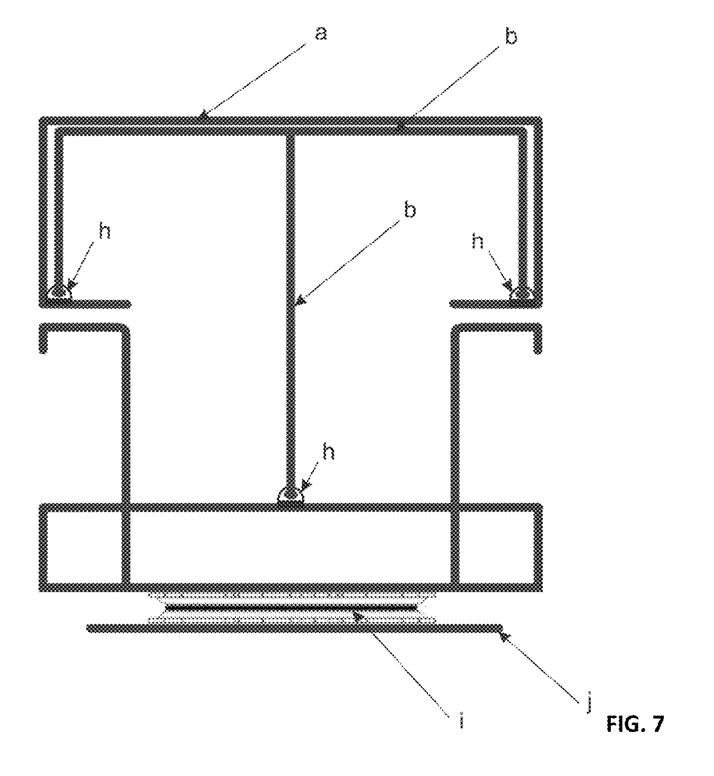
FIG. 7 is a schematic cut section of the main container of FIG. 1, containing the secondary body of FIG. 3 inside, mounted on the rotatory base of FIG. 5.
Figure 8:
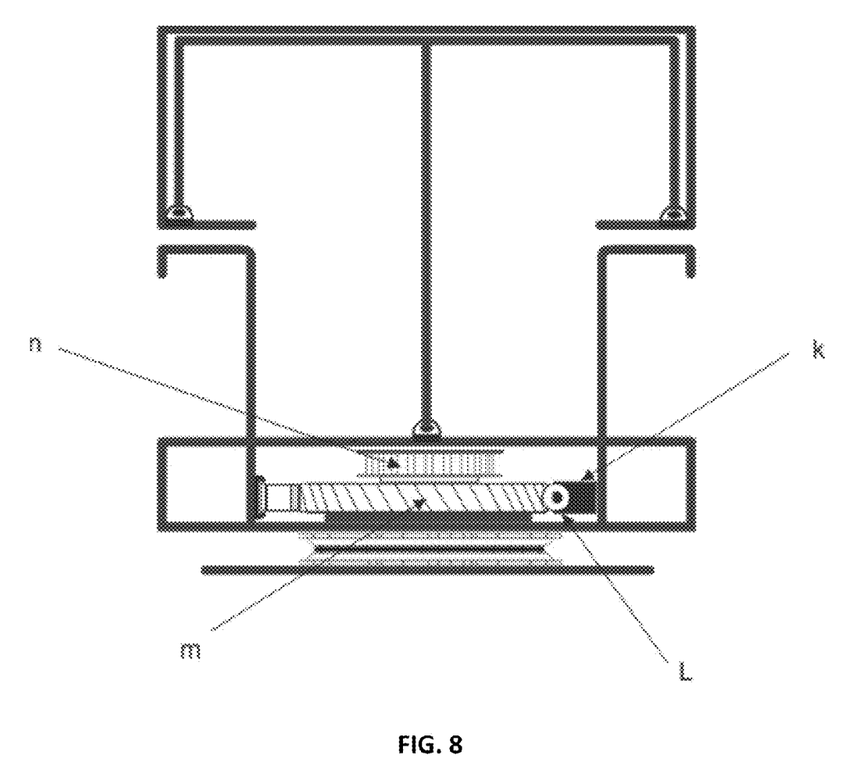
FIG. 8 is the same cut than FIG. 7, but it shows the transmission mechanism that allows the unfolding, including a worm screw, a gear ring, a servomotor, and a geared pulley.
Figure 19:
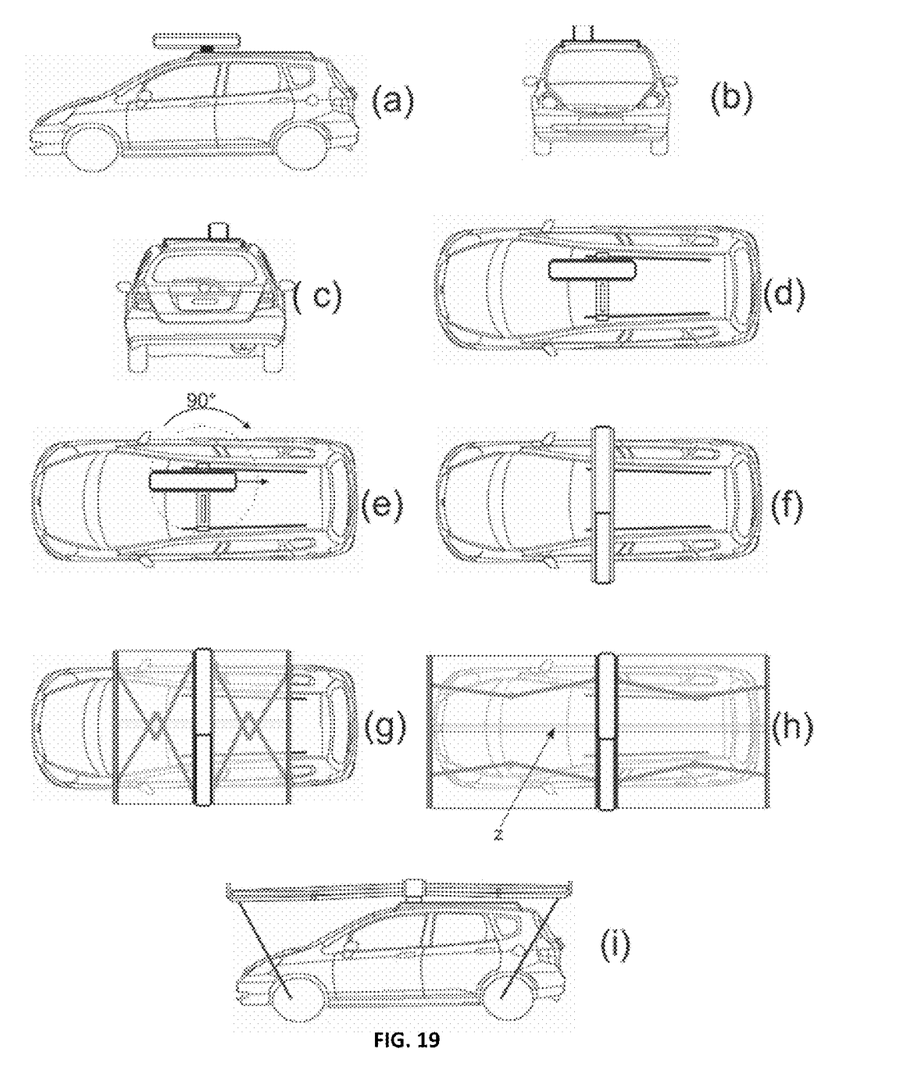
FIG. 19 illustrates the sequence of use of the automatic multipurpose shield device:
(a) is a side view of the automatic multipurpose shield device mounted on a vehicle;
(b) is a front view of the automatic multipurpose shield device mounted on a vehicle;
(c) is a rear view of the automatic multipurpose shield device mounted on a vehicle;
(d) is a top view of the automatic multipurpose shield device mounted on a vehicle;
(e) is a schematic top view of the radius of gyration of the automatic multipurpose shield device mounted on a vehicle;
(f) is a schematic top view of the unfolding of the secondary body of the automatic multipurpose shield device mounted on a vehicle;
(g) is a schematic top view of the unfolding process of the automatic multipurpose shield device on a vehicle;
(h) is a schematic top view of the automatic multipurpose shield device unfolded on a vehicle;
(i) is a schematic side view of the automatic multipurpose shield device unfolded on a vehicle.

Said structure comprises two parts: a main container body (a) and a secondary body (b), the latter located inside the main body in a resting state, as shown in FIG. 19 a,b,c,d,e. The secondary body (b) comes into contact with the main body (a) through linear guideways or longitudinal rails (h), as shown in the schematic cut view of FIG. 7.

The cross bars of the roof rack (j) of the vehicle support the main body through a rotatory base (i). Said base is connected to a worm drive system (L, m), said gear ring representing the rotatory axis of the main body through the above-mentioned rotatory base (i).

In a preferred form of this transmission system, a worm screw (L) driven by a mini servomotor (k) represents the driving wheel of the system. The gear ring (m) represents the driven wheel. With this mechanism, it is possible to transmit strength and movement between two perpendicular axes, relative to a very reduced transmission, thus obtaining high mechanical gain. Furthermore, another great advantage is the reduced space it occupies. It is also inexpensive and self-locking. That is, it is impossible to move the inlet axis through the outlet axis.

Figure 1:
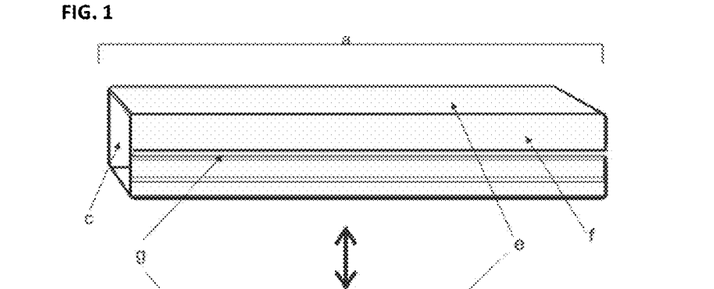
FIG. 1 shows a perspective view of the tubular structure of the main container that belongs to the automatic multipurpose shield device.
Figure 2:
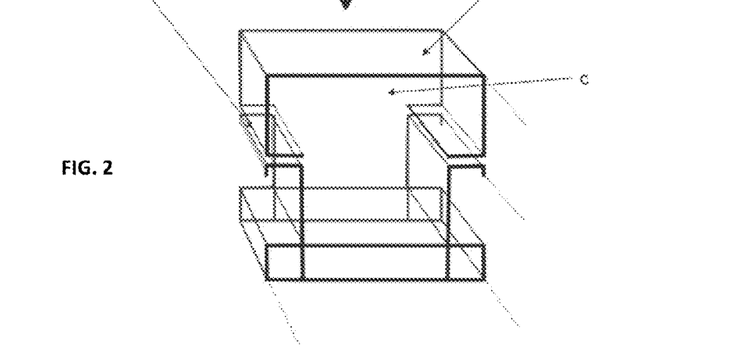
FIG. 2 shows a perspective cut section of the tubular structure of the main container corresponding to FIG. 1.
Figure 3:
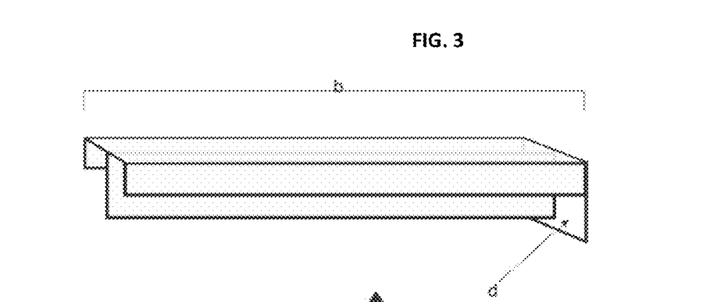
FIG. 3 is a perspective view of the tubular structure of the secondary body that is located inside the main container.
Figure 4:
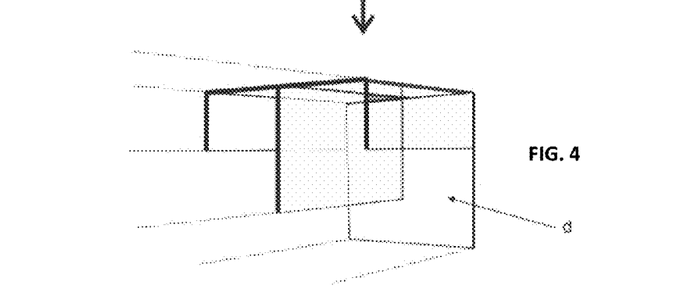
FIG. 4 is a perspective cut section of the tubular structure of the secondary body corresponding to FIG. 3.
Figure 5:
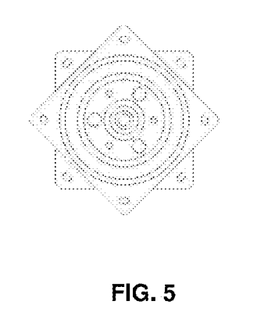
FIG. 5 shows a plan view of the rotatory base to which the main body of the automatic multipurpose shield device is mounted.
Figure 6:
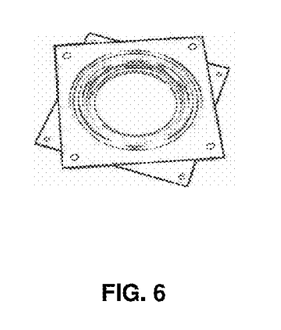
FIG. 6 is a perspective view of the rotatory base corresponding to FIG. 5, to which the main body of the automatic multipurpose shield device is mounted.

The movement of the worm drive system is transmitted to the main body as well as to a geared pulley (n) attached to said gear ring. As shown in FIG. 4, this pulley (n) transmits its movement through a geared belt (q) to another pulley of shorter diameter (p) located close to the end of the main body, and the latter, in turn, transmits its movement to a gear train (t) that produces the shifting of a rack (s) that is attached to the main body by an extendible rail (r). This rack hits the internal face of the top of the secondary body (d) and it is affixed to it, transmitting its longitudinal movement to the secondary body, printing its projection or fold(s).

The gyration printed by the worm drive system over the main body is 90°, both to take it out of the resting state (FIG. 19 $f$-$i$) and to return it to same (FIG. 19 $a$-$e$).

Figure 9:
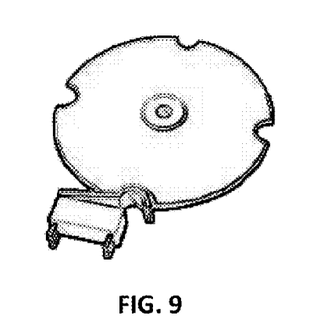
FIG. 9 is a perspective view of an optional rotation-control mechanism through microswitch.
Figure 10:
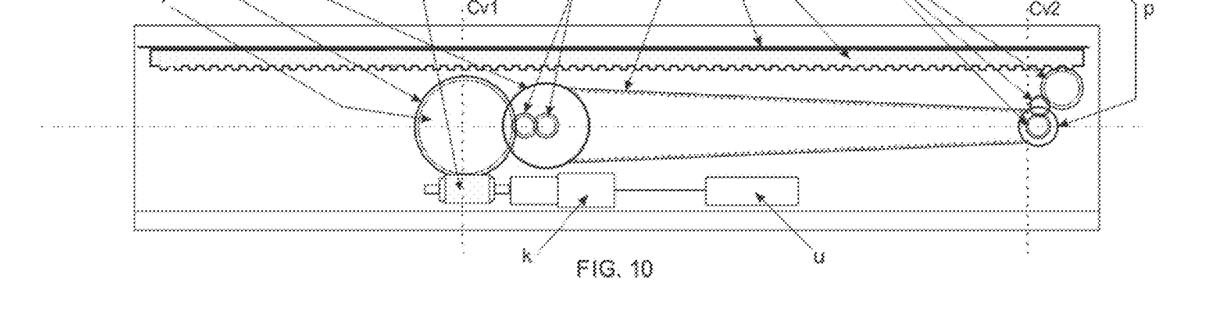
FIG. 10 shows a schematic plan view of the rotation and projection mechanisms of the multipurpose shield device, wherein the shield is refolded.
Figure 11:
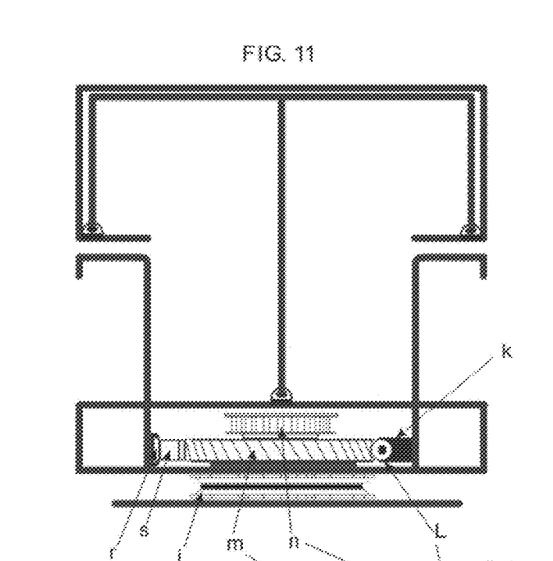
FIG. 11 is a schematic cut section at the level of the rotatory base, as high as the Cv1 indication in FIG. 10, which shows a part of the unfolding mechanism.
Figure 12:
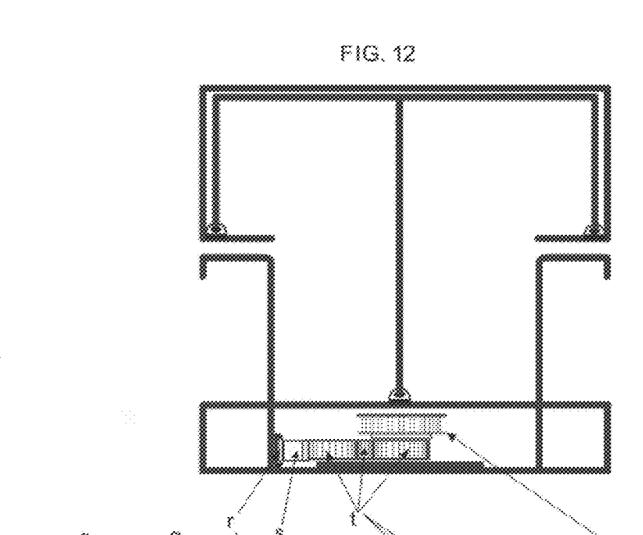
FIG. 12 is a schematic cut section at the level of the geared pulley, as high as the Cv2 indication of FIG. 10, which shows the end of the unfolding mechanism.

The servomotor (k) is preferably an electric motor with direct current, combined with a reducing mechanism and a position sensor system that is electronically controlled by an electronic control unit (E.C.U.) (u). As an alternative to the position control (90° gyration) through the above-mentioned sensor, the adjustment of the gear ring or the insertion of a wheel is contemplated, in the same gear axis, with slots to control the servomotor through a microswitch (FIG. 9).

The E.C.U. (u) fulfills this and other functions that cause the complete movement of the set, controls the tubular motors, and optionally would also control the linear mini actuators mounted on the fixed and movable projecting arms.

Figure 13:
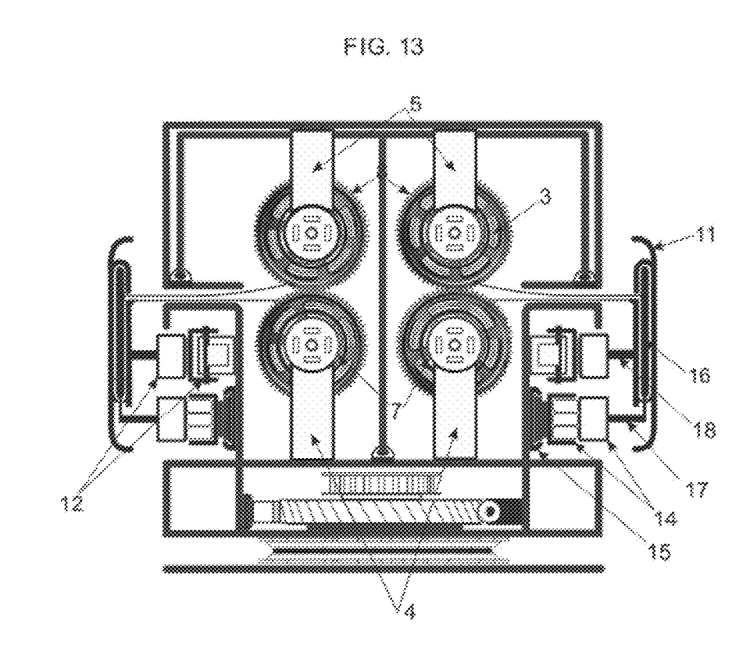
FIG. 13 is a schematic cut section at the level of the rotatory base, as high as the Cv1 indication of FIG. 10, but showing the shield's projection, unfolding and fastening mechanism.
Figure 14:
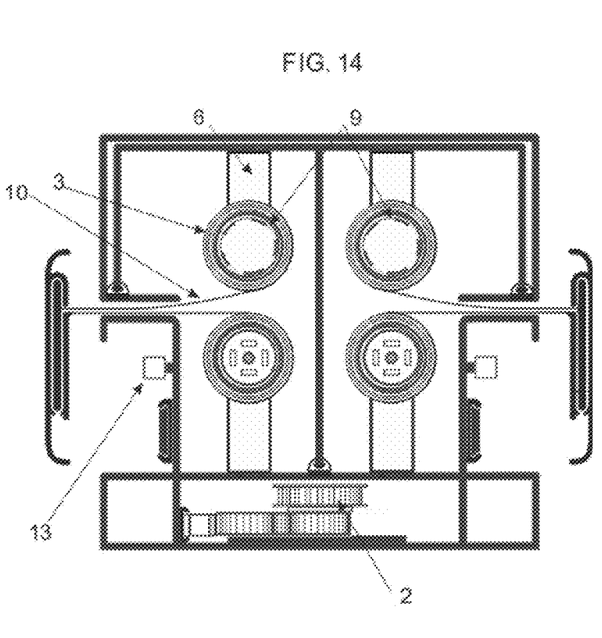
FIG. 14 shows a schematic cut section at the level of the geared pulley, as high as the Cv2 indication of FIG. 10, but showing the shield's projection, unfolding and fastening system.

Inside the tubular structure, there are two pairs of protective fabric or flexible solar cells rolls (3), (20), with the following distribution:

A lower pair, attached to the main body by terminal supports (4);

An upper pair, with one (proximal) end supported from the main body (5) and the other (distal) end with supports fixed to the secondary body (6), as shown in FIGS. 13 and 14.

Each of the axes that constitute the lower pair is composed of a tubular motor with direct current inside a winding tube (7) and has, adjusted at its end, a gear for direct transmission towards an equal gear also fixed at the proximal end of the upper axes (8). Said upper axes (8), unlike the lower ones, are not fitted with tubular motors; instead, they are formed by a set of grooved axes (22) located inside the corresponding winding tubes (9), (21).

Each of the motorized axes causes, through rotation, the reverse movement on the upper passive axes through direct transmission between the gears.

From the side view, each of the shield rolls, whether of flexible solar cells or for protection against hail, is unfolded as follows:
left upper roll: clockwise,
right upper roll: anticlockwise,
left lower roll: anticlockwise,
right lower roll: clockwise.

The main body has two grooves, a front groove (g) and a rear groove, through which the corresponding fabrics (10) are slid. During the resting state, these grooves are sealed through a box system that also covers the projecting arms (11). Each pair of front and rear shield rolls has on their adjacent edge, straps of 'Velcro grip' (z) along its length, as shown in FIG. 19 $h$, except on its free end to provide the shifting of the upper rolls when the secondary body is projected or retracted.

The main body (a) of the device comprises below the grooves (g), both on its front and rear side, an articulated projecting arm (12) supported by a longitudinal bar fixed to the main body (13).

Below each of the arms, a projecting arm (14) is provided, which is fixed to the main body (a) through a robust extendible rail (15). Each of the movable articulated arms is attached on its base, in contact with the rail, to the internal face of the top of the secondary body by an adjustable anchor (23).

The application of crossed arms provides the projection needed, since the outlet is limited by the length of the available line, i.e., there is a 'more-outlet-than-line' situation.

The box system comprises on both sides of the two moldings, a main molding (11) attached to the lower fabric roll, and a secondary molding (16) attached to the upper fabric roll by a groove in the main molding. The secondary molding is located inside the main molding as a rail, allowing the secondary molding to shift inside the container molding when the movable articulated arm, to which it is attached by a joint (17), is shifted jointly with the secondary body, shifting at the same time and on the same direction the edge of the upper fabric (end of the fabric roll to which the secondary molding is attached by the above-mentioned groove). In turn, the container or main molding is attached to the fixed articulated arm also by a joint (18).

Figure 15:
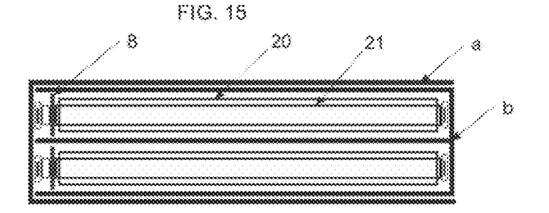
FIG. 15 is a schematic plan view of the unfolding system of the automatic multipurpose shield device at the level of the upper rolls, wherein the system is closed or in a resting state.
Figure 16:
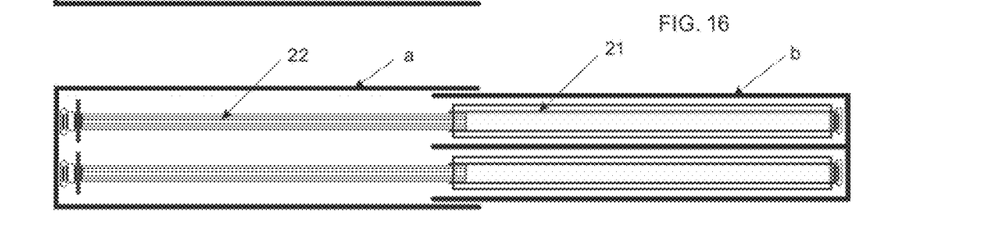
FIG. 16 is a schematic plan view of the unfolding system of the automatic multipurpose shield device at the level of the upper rolls, wherein the system is open or at a use position.
Figure 17:
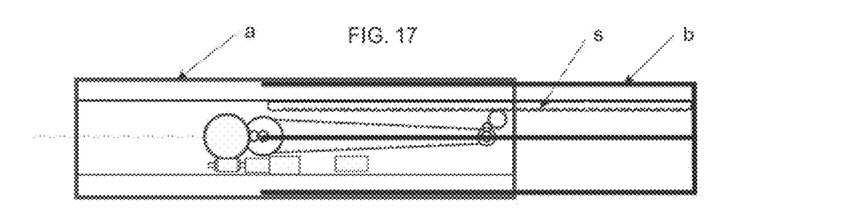
FIG. 17 is a schematic plan view of the unfolding system of the automatic multipurpose shield device at the level of the rotatory base, wherein the system is in the unfolding process.
Figure 18:
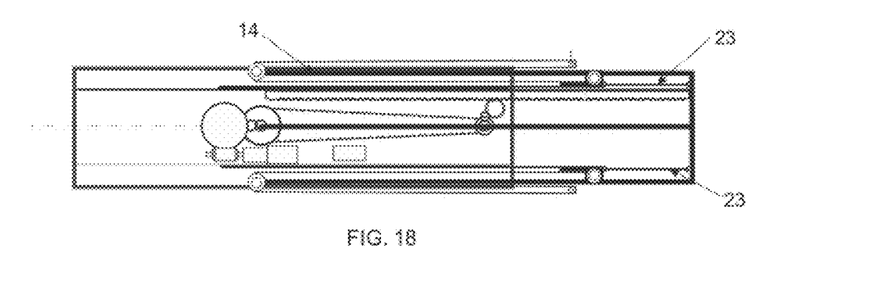
FIG. 18 is a schematic plan view of the unfolding system of the automatic multipurpose shield device at the level of the movable arms, wherein the system is in the unfolding process.
Figure 20:
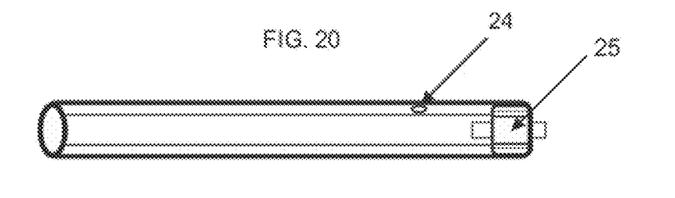
FIG. 20 is a longitudinal cut of the roll holder tube of the flexible solar panel.

FIG. 20 shows a roll holder tube that carries flexible solar cells comprising an inlet hole (24) of the solar panel bipolar conductor, while comprising, on its right end, a rotatory electric collector (25), preferably of the slip ring-type. The left end of the roller holder tube will contact the upper axis (8), in an equivalent manner as shown in the horizontal cut view of FIG. 15.

Figure 21:
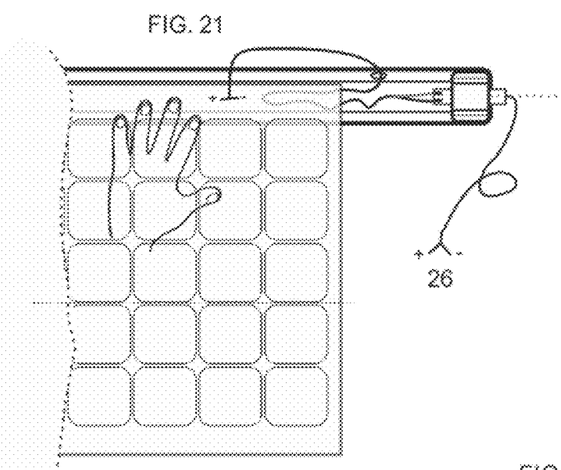
FIG. 21 shows a connection scheme of the rotatory electric collector in parallel with the panels and also with the load controller.

FIG. 21 shows in detail the connection (26) in parallel with the other panels and then with the load controller.

The device expects that with the batteries connected to the solar panels, the regulator of the motor alternator detects a significant voltage in the load circuit and blocks the alternator considering that the batteries are fully charged. The problem may be solved alternating a relay that will cut the current of the panels when the contact key of the motor is connected.

Figure 22:
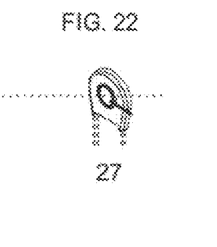
FIG. 22 is a detail of the collector-fixing support.

FIG. 22 reveals a preferred support (27) of the worm screw-type for fixing the rotatory electric collector (25).

Figure 23:
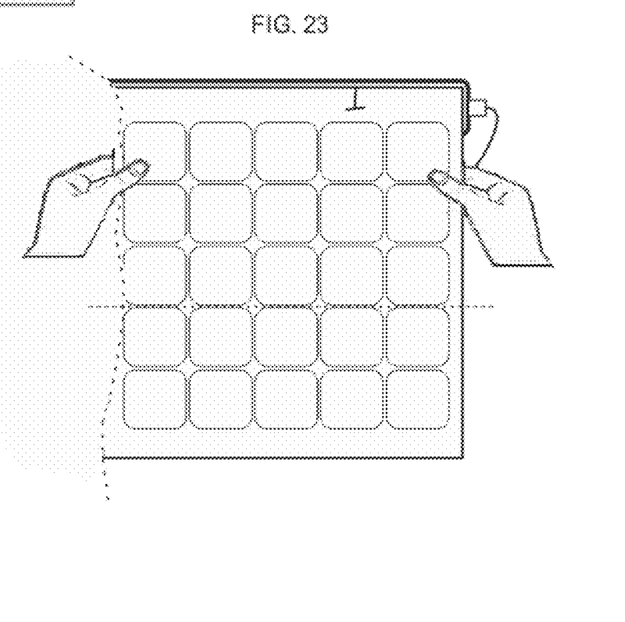
FIG. 23 is a scheme of the panel being fixed to the tube.

FIG. 23 finally shows the fixation of the flexible solar panel to the tube by an adhesive band.

The setting of the rotation system and projection of the set and their convenient location on the side of the vehicle's roof allows the unfolding of the shield fabrics to cover at least the width outlined between the ends of the rear-view mirrors and the entire length of the automobile, as shown in FIG. 19 $h$. This ensures total protection of the goods, maximum usage of the surface carrying the solar cells and the possibility to use the device anywhere without affecting the environment, for example, a public parking lot.

The movement transmission system of the main and secondary body can easily undergo variations in order to improve its efficiency or to make the device more compact, adjusting the transmission ratio of the system, affecting the composition and setting of the gear train, and the gear outlet speed to obtain the appropriate shifting in both the main and secondary body.

The claimed device may be actuated from a command spot (distance command- or switch-type), or from an automatism (wind sensor anemometer, solar and rain sensor) for safe operation of the system depending on climate conditions, including self-folding, when it is used as a protector against sun and hail.

The projecting arms may be made of extruded aluminum and include as tension system any of its three most well-known variants (chain-spring, double spring cable or cable-spring) that allows maximizing the tension of the fabric.

For this automatic multipurpose shield system, in an embodiment as a protector against sun and hail, the use of glass fiber fabrics with close weave, soaked in PTFE o variants thereof is contemplated.

The glass fiber has relevant advantages of hardness, durability and stability, as well as optimal conditions against lengthening and fire resistance. The glass fiber interlayer makes the fabric resistant to mildew and humidity.

In addition, in order to strengthen said fabrics even more, the component Kevlar® may also be incorporated (used in bullet-proof vests).

Another embodiment contemplates the replacement of tubular motors by rolling drums such as those used in projection screens and self-rolling curtain systems.

However, the foregoing is not limitative of the present invention, being it possible to choose other variants of protective fabrics, depending both on composition and benefits, existing in the market or appearing in the future, and which perfectly adapt to the automatic protective system.

Regarding an embodiment as a screen carrying flexible solar cells, it comprises a series of photovoltaic modules encapsulated in laminated or multi-layer pieces.

All that has been described and represented in the attached drawings clearly highlights the advantages of constructive and functional order, which characterize the invention considered by the prior art, perfectly clarifying the right of the inventor to introduce subsequent detail modifications without departing from the limits and scope of the following claims.

The invention claimed is:

1. Automatic multipurpose shield device for vehicles comprising a tubular structure configured to rotate and project the whole shield device, wherein said tubular structure comprises two parts, a main container body and a secondary body located inside the main body in a resting state, through means that connect both bodies, comprising inside said tubular structure at least two pairs of shield rolls, a lower pair connected to the main body by terminal supports and an upper pair, with a proximal end supported from the main body and the other distal end with supports fixed to the secondary body; wherein each of the axes that constitute the lower pair comprises a motor located inside the main body and gears for direct transmission towards other equal gears; the upper axes comprising a set of axes located inside the corresponding winding tubes; said tubular structure comprising a pair of articulated projecting arms and another pair of projecting arms located below the previous pair, which are attached to the main body of the device by a robust extendible rail; said main body of the tubular structure being supported by cross bars of the roof rack, through a rotatory base connected to a worm drive system.

2. Automatic multipurpose shield device for vehicles of claim 1, wherein the main body of the tubular structure comprises, while in a resting state, a box system that covers the projecting arms.

3. Automatic multipurpose shield device for vehicles of claim 1, wherein the pair of articulated projecting arms is fixed to the main body.

4. Automatic multipurpose shield device for vehicles of claim 2, wherein the box system comprises on both sides two moldings, a main molding and a secondary molding attached to the upper and lower shield rolls.

5. Automatic multipurpose shield device for vehicles of claim 4, wherein the secondary molding is located inside the main molding as a rail and connected to the movable articulated arm by a joint.

6. Automatic multipurpose shield device for vehicles of claim 4, wherein the container or main molding is connected to the fixed articulated arm by a joint.

7. Automatic multipurpose shield device for vehicles of claim 1, wherein the movement of the worm drive system is driven by a mini servomotor and it is transmitted both to the main body and to a geared piece attached to said gear ring.

8. Automatic multipurpose shield device for vehicles of claim 1, wherein the multipurpose shield comprises flexible solar cells.

9. Automatic multipurpose shield device for vehicles of claim 1, wherein the multipurpose shield comprises a glass fiber fabric with close weave, soaked in PTFE or the like, including an impact resistant component or the like.

* * * * *